United States Patent
Cook et al.

(10) Patent No.: US 9,922,470 B2
(45) Date of Patent: *Mar. 20, 2018

(54) METHOD AND SYSTEM FOR TUNING THE EFFECT OF VEHICLE CHARACTERISTICS ON RISK PREDICTION

(71) Applicant: Lytx, Inc., San Diego, CA (US)

(72) Inventors: Bryon Cook, San Diego, CA (US); Peter Ellegaard, San Diego, CA (US); Hongying Li, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/880,110

(22) Filed: Oct. 9, 2015

(65) Prior Publication Data
US 2016/0035158 A1 Feb. 4, 2016

Related U.S. Application Data

(63) Continuation of application No. 14/027,038, filed on Sep. 13, 2013, now Pat. No. 9,189,899, which is a
(Continued)

(51) Int. Cl.
*B60Q 1/00* (2006.01)
*G07C 5/08* (2006.01)

(52) U.S. Cl.
CPC .............. *G07C 5/0808* (2013.01); *B60Q 1/00* (2013.01); *G07C 5/085* (2013.01)

(58) Field of Classification Search
CPC ........ G07C 5/0808; G07C 5/085; B60Q 1/00; B60W 50/15; B60W 40/09;
(Continued)

(56) References Cited

U.S. PATENT DOCUMENTS

| | | | | |
|---|---|---|---|---|
| 7,826,948 B2 * | 11/2010 | Messih | ................ | B60G 17/016 180/282 |
| 8,090,598 B2 | 1/2012 | Bauer | | |
| 8,140,358 B1 | 3/2012 | Ling | | |
| 8,269,617 B2 * | 9/2012 | Cook | ..................... | G07C 5/085 340/439 |
| 8,564,426 B2 * | 10/2013 | Cook | ..................... | G07C 5/085 340/439 |
| 8,989,959 B2 | 3/2015 | Plante | | |
| 9,245,391 B2 | 1/2016 | Cook | | |
| 9,317,980 B2 | 4/2016 | Cook | | |

(Continued)

*Primary Examiner* — Anh V La
(74) *Attorney, Agent, or Firm* — Van Pelt, Yi & James LLP

(57) ABSTRACT

A Method and System for Tuning the Effect of Vehicle Characteristics on Risk Prediction is disclosed. The system many incorporate many of those driver risk assessment system features previously disclosed by Assignee's Prior Applications. The present system provides a major functional distinction from those prior systems by adding the feature of real-time tuning of the risk assessment/prediction/analysis system in response to ongoing changes in vehicle motion characteristics. Specifically, system monitors the vehicle center of gravity for changes on a real-time basis, and then adjusts the risk prediction/assessment/analysis system responsively. The system executes an initialization feature that implements an initial, or series of initial vehicular motion profiles at the commencement of either a driving trip of the system being powered up. A catalog or index of "standardized" motion profiles are accessible for initial comparison to actual vehicle motion characteristics in order to streamline the tuning of the driver risk analysis system. The system determines if and when an offset in Center of Gravity (i.e. from where initialized) has occurred, after which the system responsively tunes the driver risk assessment/prediction/analysis/reporting system.

20 Claims, 9 Drawing Sheets

Related U.S. Application Data continuation of application No. 13/586,750, filed on Aug. 15, 2012, now Pat. No. 8,564,426, which is a continuation of application No. 12/359,787, filed on Jan. 26, 2009, now Pat. No. 8,269,617.

(58) Field of Classification Search
CPC .......... B60W 2050/146; B60W 40/13; B60W 40/10; B60W 30/04; B60W 40/076; B60W 40/072; B60W 2550/142; B60W 10/22; B60W 2520/18; B60W 10/18; B60W 2030/043; B60W 2720/18; G01G 19/086; B60T 8/1755; B60T 8/246; B60T 8/241; B60T 8/17551; B60T 2230/03; B60T 2210/22; B60T 2250/02; B60T 8/24; B60R 21/0132; B60R 2021/0018
USPC ............... 340/439, 440, 438, 425.5; 701/124
See application file for complete search history.

(56) References Cited

U.S. PATENT DOCUMENTS

| | | |
|---|---|---|
| 2002/0111725 A1 | 8/2002 | Burge |
| 2004/0236474 A1* | 11/2004 | Chowdhary ....... G06Q 30/0601 701/1 |
| 2005/0219058 A1* | 10/2005 | Katagiri ................ B60W 40/09 340/575 |
| 2007/0063875 A1* | 3/2007 | Hoffberg ............. G08G 1/0104 340/995.1 |
| 2007/0268158 A1 | 11/2007 | Gunderson |
| 2009/0040054 A1 | 2/2009 | Wang |
| 2012/0158436 A1 | 6/2012 | Bauer |
| 2014/0113619 A1 | 4/2014 | Tibbitts |

* cited by examiner

METHOD AND SYSTEM FOR TUNING THE EFFECT OF VEHICLE CHARACTERISTICS ON RISK PREDICTION

CROSS REFERENCE TO OTHER APPLICATIONS

This application is a continuation of U.S. patent application Ser. No. 14/027,038, now U.S. Pat. No. 9,189,899, entitled METHOD AND SYSTEM FOR TUNING THE EFFECT OF VEHICLE CHARACTERISTICS ON RISK PREDICTION filed Sep. 13, 2013 which is incorporated herein by reference for all purposes; which is a continuation of U.S. patent application Ser. No. 13/586,750, now U.S. Pat. No. 8,564,426, entitled METHOD AND SYSTEM FOR TUNING THE EFFECT OF VEHICLE CHARACTERISTICS ON RISK PREDICTION filed Aug. 15, 2012 which is incorporated herein by reference for all purposes; which is a continuation of U.S. patent application Ser. No. 12/359,787, now U.S. Pat. No. 8,269,617, entitled METHOD AND SYSTEM FOR TUNING THE EFFECT OF VEHICLE CHARACTERISTICS ON RISK PREDICTION filed Jan. 26, 2009 which is incorporated herein by reference for all purposes.

This application is an improvement upon the systems, methods and devices previously disclosed in application Ser. No. 11/382,222, filed May 8, 2006, Ser. No. 11/382,239 filed May 8, 2006, Ser. No. 11/566,539 filed May 8, 2006, Ser. No. 11/467,694 filed May 9, 2006, Ser. No. 11/382,328 filed May 9, 2006, Ser. No. 11/382,325 filed May 9, 2006, Ser. No. 11/465,765 filed Aug. 18, 2006, Ser. No. 11/467,486 filed Aug. 25, 2006, Ser. No. 11/566,424 filed Dec. 4, 2006 and Ser. No. 11/566,526 filed Dec. 4, 2006, ("Prior Applications"), and as such, the discloses of those Prior Applications are incorporated herein by reference.

BACKGROUND OF THE INVENTION

1. Field of the Invention

This invention relates generally to systems for analyzing driving events and risk and, more specifically, to a Method and System for Tuning the Effect of Vehicle Characteristics on Risk Prediction.

2. Description of Related Art

The surveillance, analysis and reporting of vehicular accidents and "events" has, for some time, been the focus of numerous inventive and commercial efforts. These systems seek to monitor a vehicle's condition while being driven by a driver, and then record and report whenever a "hazardous" condition is detected. What vehicle (and/or driver) symptoms are to constitute a "hazardous" event or condition is defined in the context of a particular monitoring system. Each system will monitor one or more sensor devices located in the vehicle (e.g. shock sensors, location sensors, attitude/orientation sensors, sound sensors), and will generally apply a threshold alarm level (of a variety of levels of sophistication) to the sensor(s) output to assign an event or a non-event. Prior systems of note include the following patents and printed publications: Guensler; et al., US2007/0216521 describes a "Real-time Traffic Citation Probability Display System and Method" incorporates environmental factors and geocentric risk elements to determine driver risk of citation in real-time. Gunderson, et al., US2007/0257804 describes a "System and Method for Reducing Driving Risk with Foresight." The Gunderson system and method introduces driver coaching into the driver risk analysis system and method. Warren, et al., US2007/0027726 is a system for "Calculation of Driver Score Based on Vehicle Operation for Forward-looking Insurance Premiums." Warren calculates insurance premiums using geomapping to subdivide underwriting areas. Gunderson, et al., US2007/0271105 is a "System and Method for Reducing Risk with Hindsight" that provides forensic analysis of a vehicle accident, including video of the driver and area in front of the vehicle. Gunderson, et al., US2007/0268158 is a "System and Method for Reducing Risk with Insight." This Gunderson method and system monitors driving for the purpose of analyzing and reporting events on a driver-centric basis. Gunderson, et al, US2007/0257815 is a "System and Method for Taking Risk out of Driving," and introduces the creation of a driver coaching session as part of the driving monitoring system. Warren, et al., US2006/0253307 describes "Calculation of Driver Score based on Vehicle Operation" in order to assess driver risk based upon a vehicle/driver geolocation and duration in risky locations. Warren, et al., US20060053038 is related to the '307 Warren, that further includes activity parameters in determining driver risk. Kuttenberger, et al., is a "Method and Device for Evaluating Driving Situations." This system does calculate driving risk based upon accelerometers and other vehicle characteristics. Finally, Kuboi, et al. is a "Vehicle Behavior Analysis System" that includes GPS, video and onboard triggers for notification/storing/uploading data related to the vehicle behavior.

A detailed review of each of these prior systems has been conducted, and while each and every one of them discloses what is purported to be a novel system for vehicle risk monitoring, reporting and/or analysis, none of these prior systems suggests a system that uses real-time monitoring of the vehicle center of gravity in order to continuously "tune" the onboard vehicle risk sensing and risk predicting systems.

SUMMARY OF THE INVENTION

In light of the aforementioned problems associated with the prior systems and methods, it is an object of the present invention to provide a Method and System for Tuning the Effect of Vehicle Characteristics on Risk Prediction. The preferred system many incorporate many of those driver risk assessment system features previously disclosed by Assignee's Prior Applications. This system should provide a major functional distinction from those prior systems by adding the feature of real-time tuning of the risk assessment/prediction/analysis system in response to ongoing changes in vehicle motion characteristics. Specifically, it is an object of the present invention to monitor the vehicle center of gravity for changes on a real-time basis, and then adjust the risk prediction/assessment/analysis system responsively. The system should include an initialization feature that implements an initial, or series of initial vehicular motion profiles at the commencement of either a driving trip of the system being powered up. It would be beneficial if a catalog or index of "standardized" motion profiles were accessible for initial comparison to actual vehicle motion characteristics in order to streamline the tuning of the driver risk analysis system. A final object would be that the system determine if and when an offset in Center of Gravity (i.e. from where initialized) has occurred, after which the system would responsively tune the driver risk assessment/prediction/analysis/reporting system.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a Method and System for Tuning the Effect of Vehicle Characteristics on Risk Prediction.

Figure 1:
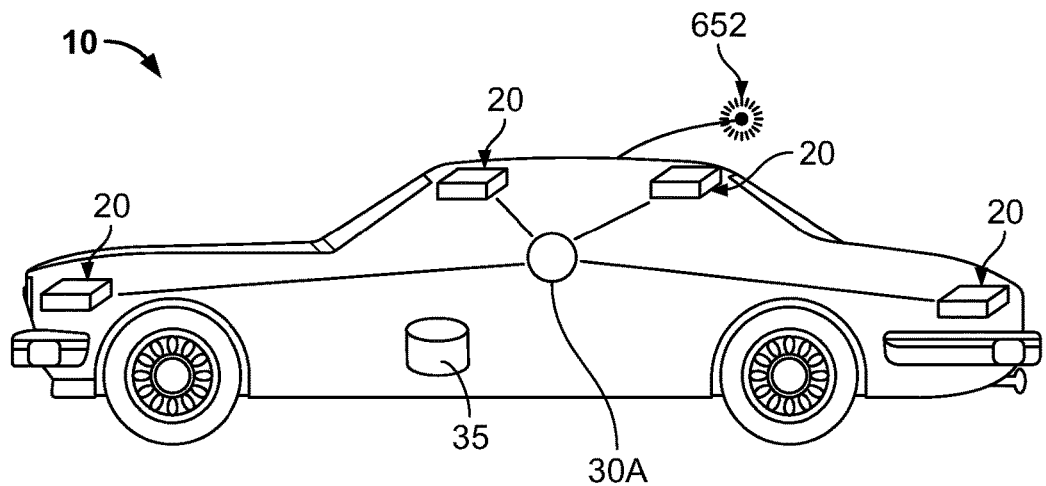
FIG. 1 is a block diagram of a conventional vehicle having a preferred embodiment of the system of the present invention installed therein.

The present invention can best be understood by initial consideration of FIG. 1. FIG. 1 is a block diagram of a conventional vehicle 10 having a preferred embodiment of the system of the present invention installed therein. The event detector 30A is in control of a one or more event capture devices 20 that are attached to the vehicle 10. The event detector 30A communicates with the capture devices 20 via wired or wireless interface. There is a data storage area 35 also associated with the event detector 30A, as will be expanded upon below in connection with other drawing figures.

The event detector 30A can be any of a variety of types of computing devices with the ability to execute programmed instructions, receive input from various sensors, and communicate with one or more internal or external event capture devices 20 and other external devices (not shown). The detector 30A may utilize software, hardware and/or firmware in a variety of combinations to execute the instructions of the disclosed method.

An example general purpose computing device that may be employed as all or a portion of an event detector 30A is later described in connection with the discussion related to FIG. 4, hereinbelow. Similarly, an example general purpose wireless communication device that may be employed as all or a portion of an event detector 30A is later described in connection with the discussion related to FIG. 5 hereinbelow.

When the event detector 30A identifies an event, the event detector 30A instructs the one or more event capture devices 20 to record pre-event data, during the event data, and post-event data that is then provided to the event detector 30A and stored in the data storage area 35. In reality, the event capture devices 20 constantly save data in a buffer memory, which allows the system to actually obtain data that was first-recorded (into a buffer memory) prior to the event itself.

Events may comprise a variety of situations, including automobile accidents, reckless driving, rough driving, or any other type of stationary or moving occurrence that the owner of a vehicle 10 may desire to know about, and is more fully described below in connection with other drawing figures.

The vehicle 10 may have a plurality of event capture devices 20 placed in various locations around the vehicle 10. An event capture device 20 may comprise a video camera, still camera, microphone, and other types of data capture devices. For example, an event capture device 20 may include an accelerometer that senses changes in speed, direction, and vehicle spacial orientation. Additional sensors and/or data capture devices may also be incorporated into an event capture device 20 in order to provide a rich set of information about a detected event.

The data storage area 35 can be any sort of internal or external, fixed or removable memory device and may include both persistent and volatile memories. The function of the data storage area 35 is to maintain data for long term storage and also to provide efficient and fast access to instructions for applications or modules that are executed by the event detector 30A.

Figure 2:
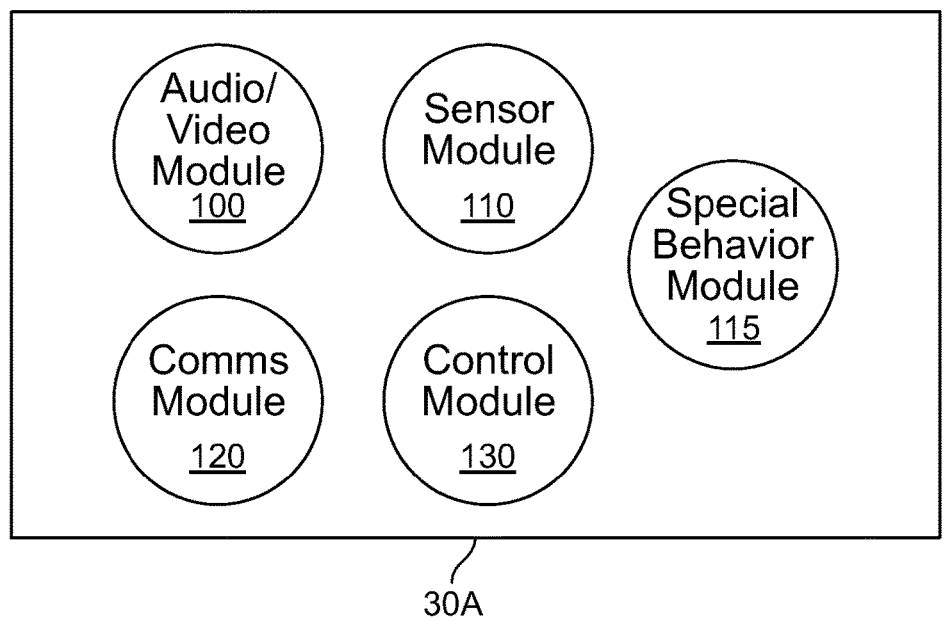
FIG. 2 is a is a block diagram depicting the event detector of the system of FIG. 1.

In one embodiment, event detector 30A in combination with the one or more event capture devices 20 identifies an event and stores certain audio and video data along with related information about the event. For example, related information may include the speed of the vehicle when the event occurred, the direction the vehicle was traveling, the location of the vehicle (e.g., from a global positioning system "GPS" sensor), and other information from sensors located in and around the vehicle or from the vehicle itself (e.g., from a data bus integral to the vehicle such as an on board diagnostic "OBD" vehicle bus). This combination of audio, video, and other data is compiled into an event that can be stored in data storage 35 onboard the vehicle for later delivery to an evaluation server. Turning to FIG. 2, we can examine some of the internal details regarding the event detector 30A.

FIG. 2 is a block diagram illustrating an example event detector 30A according to an embodiment of the present invention. In the illustrated embodiment, the event detector 30A comprises an audio/video ("AV") module 100, a sensor module 110, a communication module 120, a control module 130, and a spacial behavior module 115. Additional modules may also be employed to carry out the various functions of the event detector 30A, as will be understood by those having skill in the art.

The AV module 100 is configured to manage the audio and video input from one or more event capture devices and storage of the audio and video input. The sensor module 110 is configured to manage one or more sensors that can be integral to the event detector 30A or external from the event detector 30A. For example, an accelerometer may be integral to the event detector 30A or it may be located elsewhere in the vehicle 10. The sensor module 110 may also manage other types of sensor devices such as a GPS sensor, temperature sensor, moisture sensor, and the OBD, or the like (all not shown).

The communication module 120 is configured to manage communications between the event detector 30A and other devices and modules. For example, the communication module 120 may handle communications between the event detector 30A and the various event capture devices 20. The communication module 120 may also handle communications between the event detector 30A and a memory device, a docking station, or a server such as an evaluation server. The communication module 120 is configured to communicate with these various types of devices and other types of devices via a direct wire link (e.g., USB cable, firewire cable), a direct wireless link (e.g., infrared, Bluetooth, ZigBee), or a wired or any wireless network link such as a local area network ("LAN"), a wide area network ("WAN"), a wireless wide area network ("WWAN"), an IEEE 802 wireless network such as an IEEE 802.16 ("WiFi") network, a WiMAX network, satellite network, or a cellular network. The particular communications mode used will determine which, if any, antennae 650 is used.

The spacial behavior module 115, and its functionality, is unique as compared to prior systems. It would seem apparent that many vehicle events or triggers are related to vehicle movements (acceleration, deceleration, roll, pitch, yaw, etc.). Consequently, the treatment of the vehicle spacial motion data is critical to the effective identification of risky driving "events." Specific details will be discussed below in connection with other drawing figures, therefore it is sufficient here to mention that the spacial behavior module 115 is responsible for analyzing data related to vehicle spacial motion, and responsively making adjustments to (i.e. tuning) the event detector 30A. The real-time tuning of the event detector 30A based on vehicle spacial motion has never been attempted in a driver risk monitoring system.

Figure 3A:
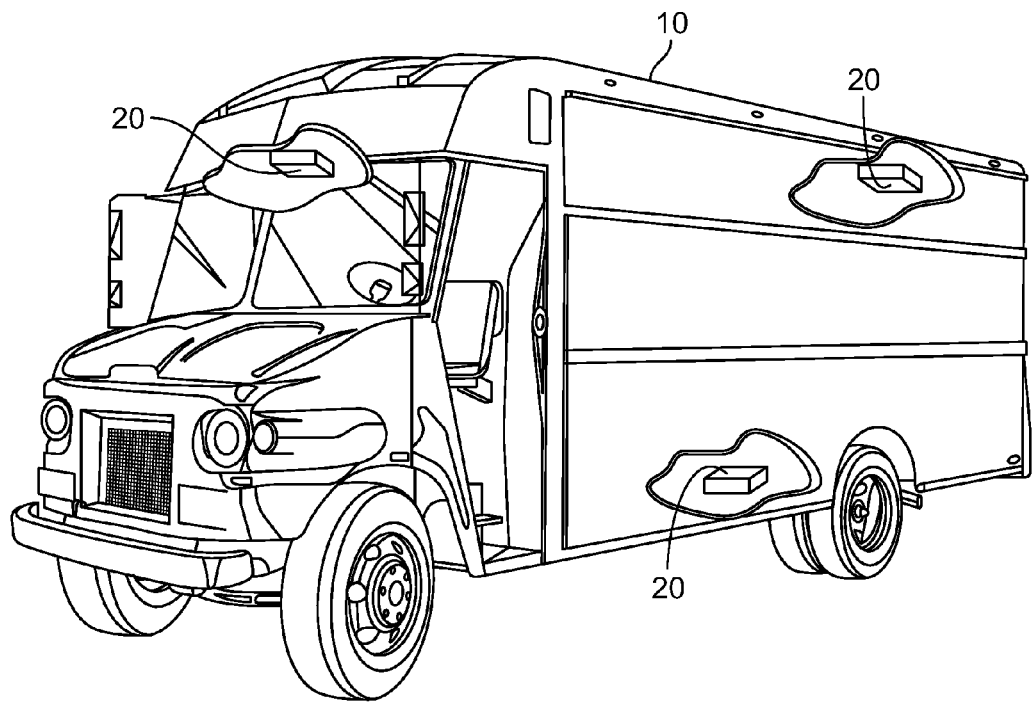
FIG. 3A is a perspective view of another vehicle having the system of FIG. 1 installed thereon.
Figure 3B:
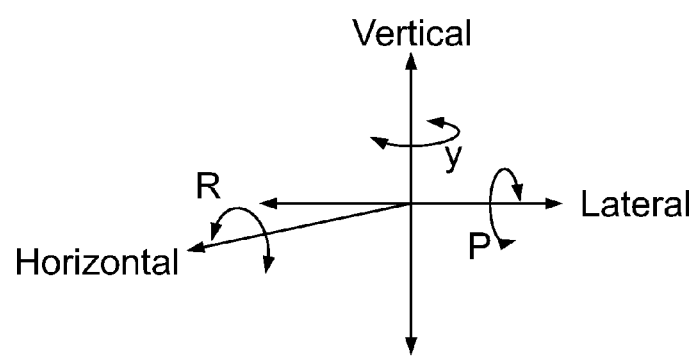
FIG. 3B depicts a three-dimensional axis and types of spacial motion.

The control module 130 is configured to control the actions or remote devices such as the one or more event capture devices. For example, the control module 130 may be configured to instruct the event capture devices to capture an event and return the data to the event detector when it is informed by the sensor module 110 that certain trigger criteria have been met that identify an event. FIGS. 3A and 3B, continue the introduction of the novel features introduced by the present invention.

FIG. 3A is a perspective view of another vehicle having the system of FIG. 1 installed thereon. One or more of the event capture devices 20 embody the ability to detect spacial motion of the vehicle 10 in non-linear directions or planes. FIG. 3B depicts a three-dimensional axis and these types of spacial motion. Specifically, Pitch ("P"), which is vehicle rotation about the lateral axis, may be detected by one or more of the capture devices 20. Similarly, Roll ("R"), which is vehicle rotation about the horizontal axis (i.e. the direction in longitudinal alignment with the vehicle) may also be detected by one or more of the capture devices 20. Finally, Yaw ("Y"), which is vehicle rotation about the vertical axis may be detected by one or more of the capture devices 20.

As will be discussed more fully below, these non-linear motion characteristics can have a strong effect on the behavior of any motion-sensing event detection system. A particular vehicle or class of vehicle will tend to exhibit its own motion characteristics in these axes, and if the event detection system takes the vehicle's spacial motion characteristics into account when determining whether or not an "event" has occurred will tend to be much more accurate at recording risky driving behaviors because the detected events will be more likely to be actual high-risk events. Furthermore, if these parameters are closely monitored, one would expect to detect vehicular changes that may indicate tampering, vehicle maintenance requirements, usage problems or modifications, and other related issues or trends. Prior to expanding on the functioning of this feature of the present system, we will first detail the basic hardware within the vehicle that handles the event data that is captured.

Figure 4:
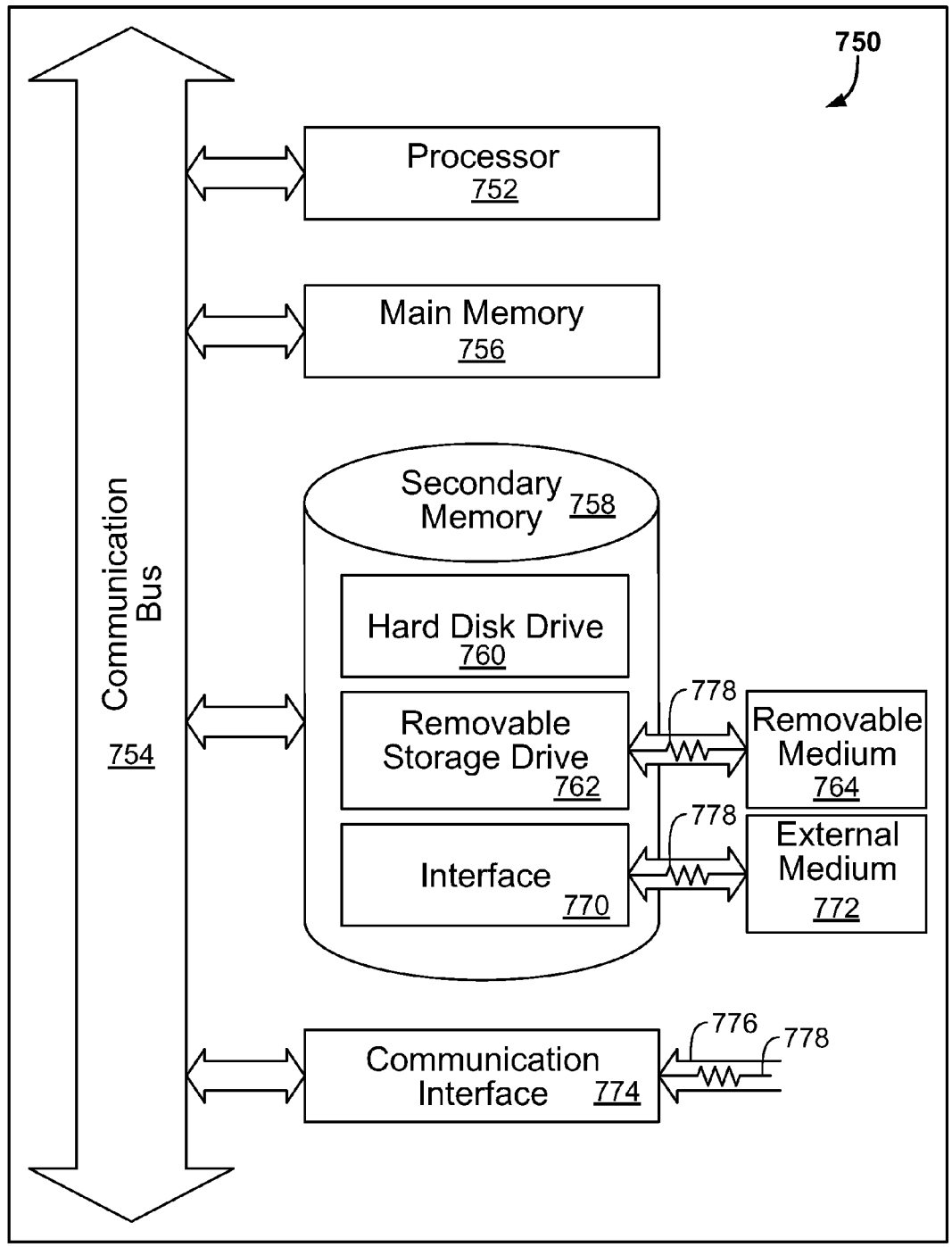
FIG. 4 is a block diagram of a conventional computing device suitable for executing the method described herein.

FIG. 4 is a block diagram of a conventional computing device 750 suitable for executing the method described hereinbelow. For example, the computer system 750 may be used in conjunction with an event detector previously described with respect to FIG. 1, or an evaluation server, analysis station, counseling station, or supervisor station described in the Prior Applications. However, other computer systems and/or architectures may be used, as will be clear to those skilled in the art.

The computer system 750 preferably includes one or more processors, such as processor 752. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 752.

The processor 752 is preferably connected to a communication bus 754. The communication bus 754 may include a data channel for facilitating information transfer between storage and other peripheral components of the computer system 750. The communication bus 754 further may provide a set of signals used for communication with the processor 752, including a data bus, address bus, and control bus (not shown). The communication bus 754 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, mini PCI express, or standards promulgated by the Institute of Electrical and Electronics Engineers ("IEEE") including IEEE 488 general-purpose interface bus ("GPIB"), IEEE 696/S-100, and the like.

Computer system 750 preferably includes a main memory 756 and may also include a secondary memory 758. The main memory 756 provides storage of instructions and data for programs executing on the processor 752. The main memory 756 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 758 may optionally include a hard disk drive 760 and/or a removable storage drive 762, for example a floppy disk drive, a magnetic tape drive, a compact disc ("CD") drive, a digital versatile disc ("DVD") drive, etc. The removable storage drive 762 reads from and/or writes to a removable storage medium 764 in a well-known manner. Removable storage medium 764 may be, for example, a floppy disk, magnetic tape, CD, DVD, memory stick, USB memory device, etc.

The removable storage medium 764 is preferably a computer readable medium having stored thereon computer executable code (i.e., software) and/or data. The computer software or data stored on the removable storage medium 764 is read into the computer system 750 as electrical communication signals 778.

In alternative embodiments, secondary memory 758 may include other similar means for allowing computer programs or other data or instructions to be loaded into the computer system 750. Such means may include, for example, an external storage medium 772 and an interface 770. Examples of external storage medium 772 may include an external hard disk drive or an external optical drive, or and external magneto-optical drive.

Other examples of secondary memory 758 may include semiconductor-based memory such as programmable read-only memory ("PROM"), erasable programmable read-only memory ("EPROM"), electrically erasable read-only memory ("EEPROM"), or flash memory. Also included are any other removable storage units 772 and interfaces 770, which allow software and data to be transferred from the removable storage unit 772 to the computer system 750.

Computer system 750 may also include a communication interface 774. The communication interface 774 allows software and data to be transferred between computer system 750 and external devices (e.g. printers), networks, or information sources. For example, computer software or executable code may be transferred to computer system 750 from a network server via communication interface 774. Examples of communication interface 774 include a modem, a network interface card ("NIC"), a communications port, a PCMCIA slot and card, an infrared interface, and an IEEE 1394 fire-wire, just to name a few.

Communication interface 774 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("SDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 774 are generally in the form of electrical communication signals 778. These signals 778 are preferably provided to communication interface 774 via a communication channel 776. Communication channel 776 carries signals 778 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 756 and/or the secondary memory 758. Computer programs can also be received via communication interface 774 and stored in the main memory 756 and/or the secondary memory 758. Such computer programs, when executed, enable the computer system 750 to perform the various functions of the present invention as previously described.

In this description, the term "computer readable medium" is used to refer to any media used to provide computer executable code (e.g., software and computer programs) to the computer system 750. Examples of these media include main memory 756, secondary memory 758 (including hard disk drive 760, removable storage medium 764, and external storage medium 772), and any peripheral device communicatively coupled with communication interface 774 (including a network information server or other network device). These computer readable mediums are means for providing executable code, programming instructions, and software to the computer system 750.

In an embodiment that is implemented using software, the software may be stored on a computer readable medium and loaded into computer system 750 by way of removable storage drive 762, interface 770, or communication interface 774. In such an embodiment, the software is loaded into the computer system 750 in the form of electrical communication signals 778. The software, when executed by the processor 752, preferably causes the processor 752 to perform the inventive features and functions to described hereinbelow.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

Figure 5:
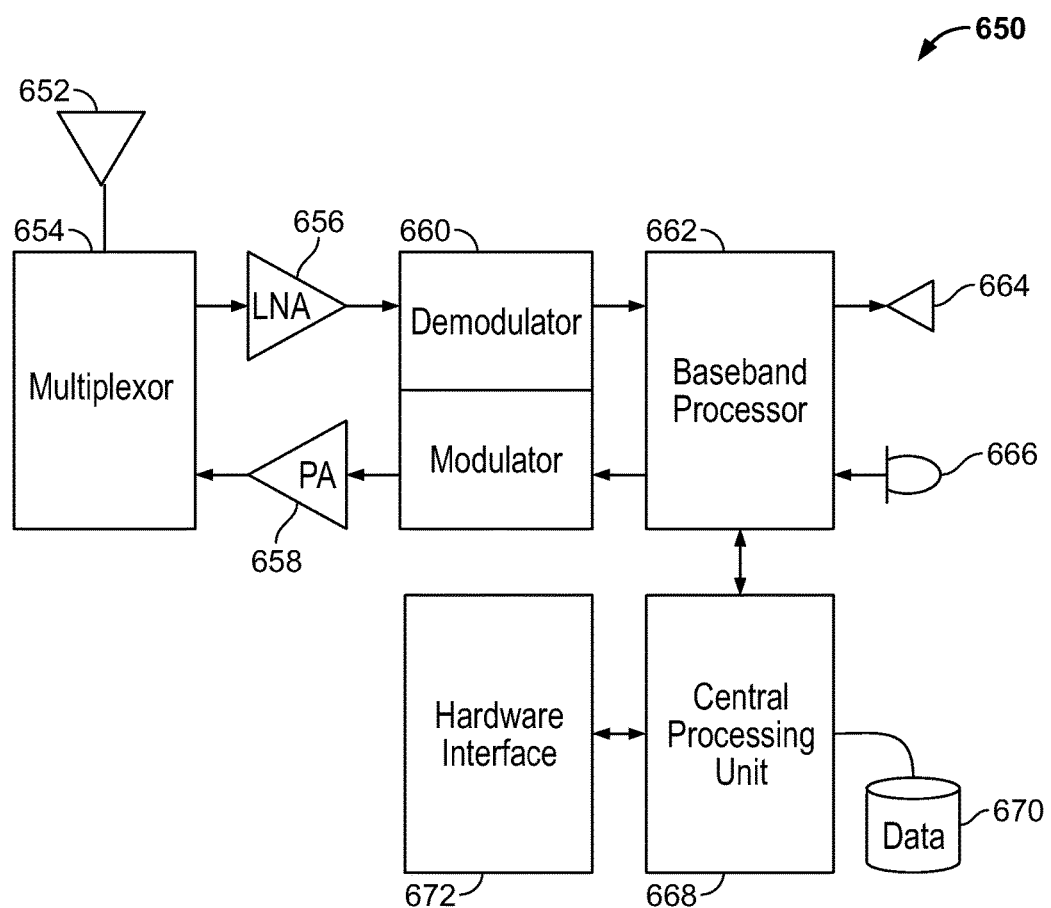
FIG. 5 is a block diagram of a conventional wireless communications device suitable for communicating between the event detector of FIG. 2 and a remote base unit.

FIG. 5 is a block diagram of a conventional wireless communications device 650 suitable for communicating between the event detector 30A of FIG. 2 and a remote base unit. For example, the wireless communication device 650 may be used in conjunction with an event detector previously described with respect to FIG. 1, or an evaluation server, analysis station, counseling station, or supervisor station previously described in the Prior Applications. However, other wireless communication devices and/or architectures may also be used, as will be clear to those skilled in the art.

In the illustrated embodiment, wireless communication device 650 comprises an antenna 652, a multiplexor 654, a low noise amplifier ("LNA") 656, a power amplifier ("PA") 658, a modulation circuit 660, a baseband processor 662, a speaker 664, a microphone 666, a central processing unit ("CPU") 668, a data storage area 670, and a hardware interface 672. In the wireless communication device 652, radio frequency ("RF") signals are transmitted and received by antenna 652. Multiplexor 654 acts as a switch, coupling antenna 652 between the transmit and receive signal paths. In the receive path, received RF signals are coupled from a multiplexor 654 to LNA 656. LNA 656 amplifies the received RF signal and couples the amplified signal to a demodulation portion of the modulation circuit 660.

Typically modulation circuit 660 will combine a demodulator and modulator in one integrated circuit ("IC"). The demodulator and modulator can also be separate components. The demodulator strips away the RF carrier signal leaving a base-band receive audio signal, which is sent from the demodulator output to the base-band processor 662.

If the base-band receive audio signal contains audio information, then base-band processor 662 decodes the signal and converts it to an analog signal. Then the signal is amplified and sent to the speaker 664. The base-band processor 662 also receives analog audio signals from the microphone 666. These analog audio signals are converted to digital signals and encoded by the base-band processor 662. The base-band processor 662 also codes the digital signals for transmission and generates a base-band transmit audio signal that is routed to the modulator portion of modulation circuit 660. The modulator mixes the base-band transmit audio signal with an RF carrier signal generating an RF transmit signal that is routed to the power amplifier 658. The power amplifier 658 amplifies the RF transmit signal and routes it to the multiplexor 654 where the signal is switched to the antenna port for transmission by antenna 652.

The baseband processor 662 is also communicatively coupled with the central processing unit 668. The central processing unit 668 has access to a data storage area 670. The central processing unit 668 is preferably configured to execute instructions (i.e., computer programs or software) that can be stored in the data storage area 670. Computer programs can also be received from the baseband processor 662 and stored in the data storage area 670 or executed upon receipt. Such computer programs, when executed, enable the wireless communication device 650 to perform the various functions of the present invention as previously described.

In this description, the term "computer readable medium" is used to refer to any media used to provide executable instructions (e.g., software and computer programs) to the wireless communication device 650 for execution by the central processing unit 668. Examples of these media include the data storage area 670, microphone 666 (via the baseband processor 662), antenna 652 (also via the baseband processor 662), and hardware interface 672. These computer readable mediums are means for providing executable code, programming instructions, and software to the wireless communication device 650. The executable code, programming instructions, and software, when executed by the central processing unit 668, preferably cause the central processing unit 668 to perform the inventive features and functions previously described herein.

Figure 6A:
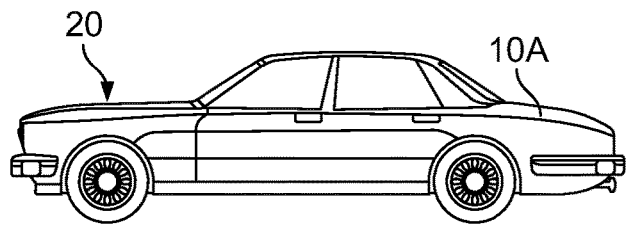
FIGS. 6A-6C depict exemplary spacial motion profiles for differing vehicle types.
Figure 6A:
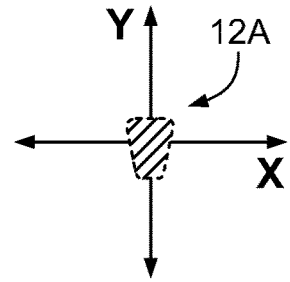
Figure 6B:
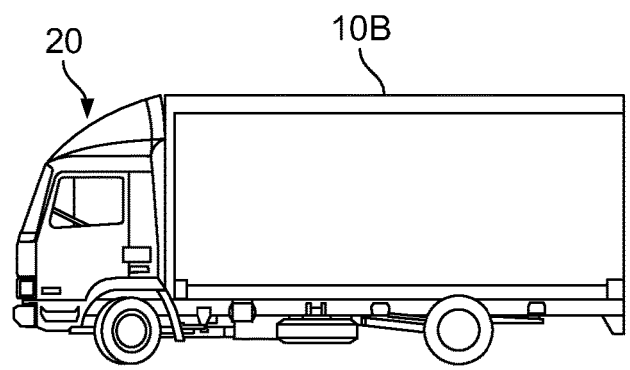
Figure 6B:
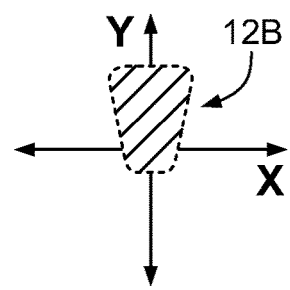
Figure 6C:
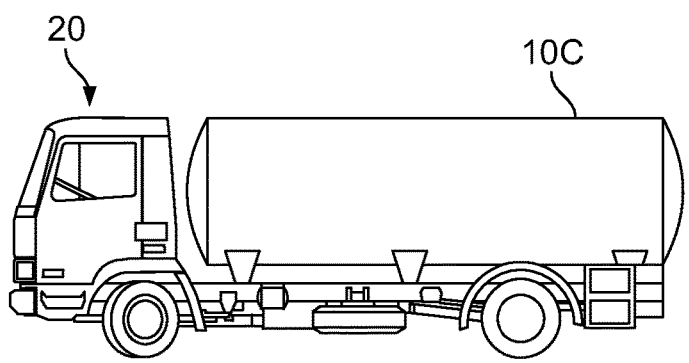
Figure 6C:
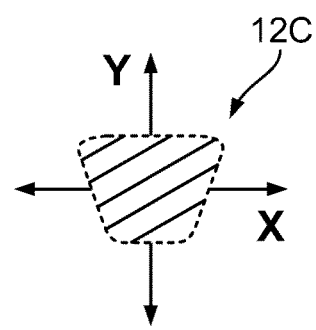

The central processing unit is also preferably configured to receive notifications from the hardware interface 672 when new devices are detected by the hardware interface. Hardware interface 672 can be a combination electromechanical detector with controlling software that communicates with the CPU 668 and interacts with new devices. FIGS. 6A-6C introduce the concepts of vehicle motion profiles.

FIGS. 6A-6C depict exemplary spacial motion profiles 12A-12C for differing vehicle types (10A-10C). The transportation industry (from toll booths to vehicle safety equipment) places vehicle types into different classes in order to manage the vehicles (whether for insurance purposes or licensing requirements, among some factors) in groups. Historically, the same approach has been used by driving event detection and reporting devices. It has been understood that a car (e.g. vehicle 12A) will handle differently than a commercial hauling vehicle (e.g. vehicle 12B), and therefore any system that uses vehicle motion characteristics as at least one factor in identifying risky driving events must take the vehicle class into account.

FIG. 6A depicts a conventional passenger vehicle 10A having one or more event capture devices 20 associated with it. The device 20 has the ability to detect vehicle motion (and acceleration) in X, Y, and Z axes, as well as detecting (optionally) Pitch, Roll and Yaw. If spacial motion data is plotted over a number of driving trips, one might expect the data points to fall within the area similar to that shown in FIG. 12A. The profile 12A would tend to be fairly compact, since a passenger vehicle 10A tends to have relatively limited range of motion, a low center of gravity, and a comparably rigid ride. As a result, a sensor for this type of vehicle would tend to be on the more sensitive end of the spectrum.

FIG. 6B depicts a conventional commercial cargo truck 10B having one or more event capture devices 20 associated with it. In the normal course of its driving usage, we would expect loading to increase and decrease. We'd expect the center of gravity of the vehicle to change radically while load composition changes and load centers of gravity move about within the cargo area. Furthermore, a vehicle such as this will tend natively to have a much higher center of gravity than a passenger vehicle. Having a high center of gravity and the other loading issues will cause the vehicle to have a much more active ride than a passenger vehicle, and to exhibit quite a bit more motion in virtually every axis. The profile 12B indicates an exemplary distribution of the motion data emanating from the event capture device 20.

A final example vehicle is depicted in FIG. 6C. The vehicle 10C is intended to represent a commercial fuel truck or the like. Such a vehicle 10C contains a liquid cargo within its hold that is effectively unrestrained from sloshing around inside of it. As a result, any spacial motion is likely to be amplified as the inertia of the liquid contents follows the motion of the vehicle 10C. While not typically having a center of gravity that is as high as the cargo hauling truck 10B, the bulk liquid hauling truck 10C (when substantially laden with liquid contents) might be expected to exhibit more roll, pitch and yaw, such as is depicted in profile 12C.

These profiles 12A-12C are presented here to illustrate that different vehicle types will be expected to exhibit different motion profiles. In order for a driving event monitoring system to effectively use this motion as a way of determining when a risky driving event has occurred, that system must adjust its trigger thresholds for vehicle class. In fact, particularly in the case of commercial vehicles used for hauling (materials or people), the particular vehicle profile must be monitored not only for its initial historical characteristics, but also must be kept under surveillance for changes to the motion profile. Changes in the spacial motion profile will not only make event detection triggering more effective, but will also be an accurate indication that changes in the vehicle or in the location or performance of the event capture devices 20 (or the event detector itself have occurred. The method of FIG. 7 discusses just such an approach.

Figure 7:
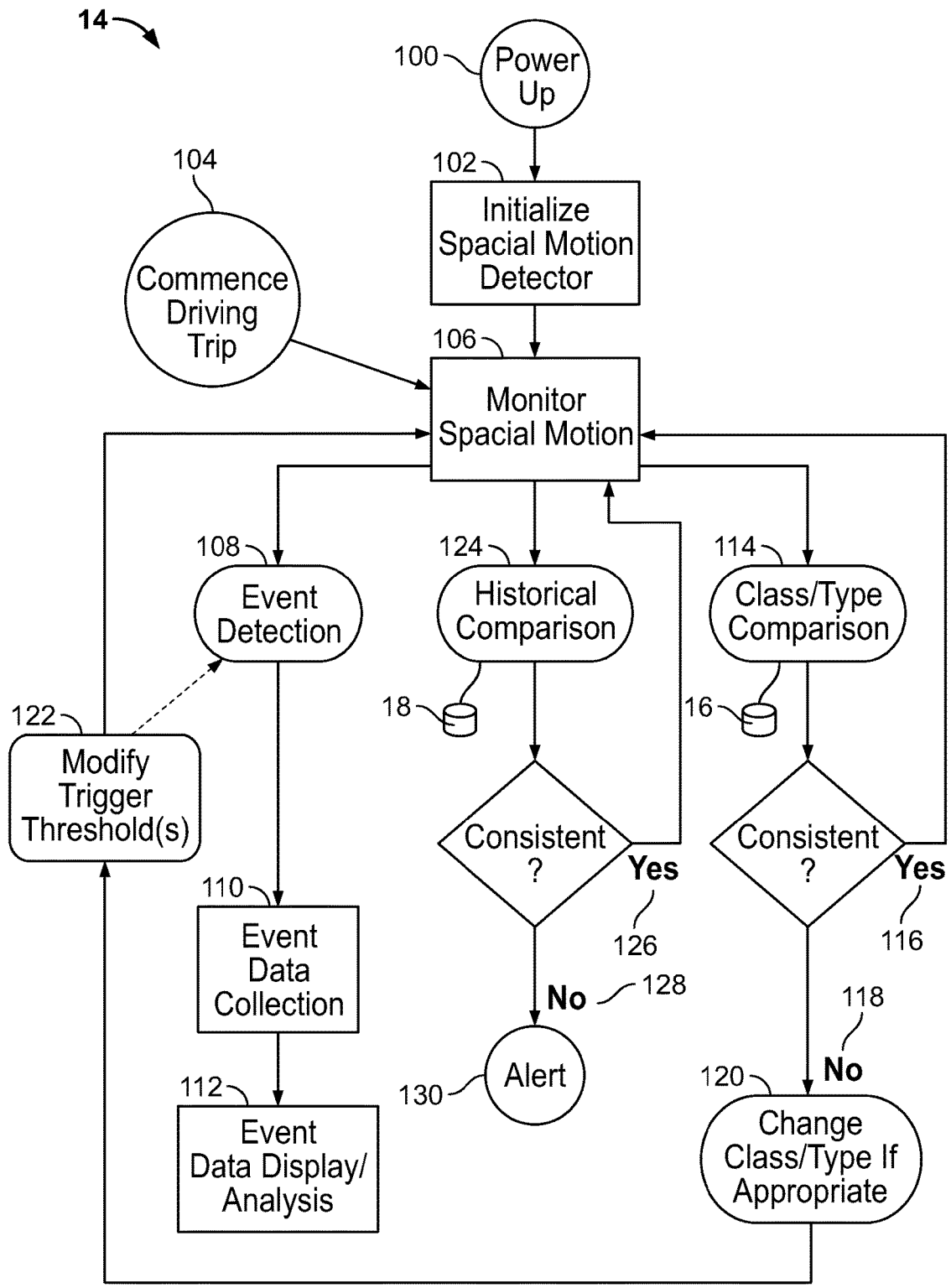
FIG. 7 is a flowchart depicting the steps of a preferred event detection method using real-time vehicle classification.

FIG. 7 is a flowchart depicting the steps of a preferred driving event detection method using real-time vehicle classification 14. Since we are focusing only on the effect of vehicle classification and vehicle spacial motion profile, we are not addressing the aspects of the driving event system related to event triggering, reporting, data handling and others. These areas are handled in detail in the context of other disclosures, including within the Parent Applications. For the purposes of this Description, it is sufficient to understand that the method discussed herein is not the entire driving risk/driving event monitoring system, but rather is a single component of such a system related to the real-time reaction to vehicle motion profile and its effect on the driving event detection system.

At power up 100, one of the numerous initialization steps of the event detector system is the initialization of the spacial motion detector(s) 102. This initialization 102 includes, among other things, detecting the global orientation of the motion detectors(s) as they relate to the vehicle. Detecting the orientation of the detector(s) will remove any issues related to proper orientation of the detector housing (i.e. relative to horizontal/vertical), since each detector will individually detect and calibrate to its orientation within the vehicle. In order to avoid an erroneous setting due to the vehicle being parked on a non-level surface, it might be preferred that the orientation initialization only occur when the system is being initially set up when it is installed in the vehicle. Alternatively, as will be discussed below, the system may simply rely on the continuing real-time adjustment to correct any errors created during the initialization stage.

The spacial detector(s) may also be initialized with a pre-set motion profile based on the vehicle class (see FIGS. 6A-6C), or upon the historical motion profile of this particular vehicle. After commencement of the driving trip 104 (potentially detected via the OBD or other vehicle speed sensor), spacial motion will be detected and monitored 106 continuously. As it is monitored, three basic functions will be applied to the data-event detection 108, comparison to pre-determined vehicle class/types 114 and comparison to the historical performance of this particular vehicle 124.

As spacial motion indicates to the event detector that an event has occurred, that event data will be collected 110. Once collected, this event data is available for display and analysis through a variety of features that are included in the overall driving risk monitoring system 112.

Event detection 108 occurs when any number of parameters are met including motion, audio, video and other data. As it applies to vehicle spacial motion, exceeding certain motion thresholds (including direction and acceleration) will trigger the event detection system to identify a "driving event."

The data source for the comparison of the real-time spacial motion to predetermined vehicle class/type data 114 is within a data repository of class/type spacial motion profiles 16. This repository 16 could be local (i.e. in the vehicle), remote (in the evaluation portion of the system), or could be removable. In any case, the repository will contain a set of standard spacial motion profiles that the event detection system expects from a standardized set of vehicle types/classes. As mentioned above, the typical system will use one of these standardized spacial motion profiles when the motion detector(s) are initialized 102.

The comparison continues 116 so long as the vehicle motion data falls within the expected vehicle profile. If the real-time data falls outside of the expected vehicle type/class in a sufficient manner 118, it might be appropriate to change the assigned class/type 120. If such a change is elected, the system will modify the trigger threshold 122 used in event detection 108, and will then continue to monitor for events using the adjusted threshold 108.

As discussed previously, keeping track of historical profiles of vehicle spacial motion may also be of interest. Historical comparison 124 to profiles stored in data repository 18 would enable the system to detect if a change to the vehicle, the event capture devices, or the event detector(s) has occurred. For example, if the event detector system was moved to a new vehicle, comparison to historical spacial motion (i.e. of the original vehicle) will very likely reveal a drastic change. If the comparison demonstrates historical consistency 126, monitoring continues. If, however, a predetermined amount of inconsistency in the profile is detected 128, then the system will provide an alert 130 of some sort. Typically, this would be a notice sent to the evaluation/main server system so that the caretaker of the entire risk monitoring system would be made aware that an equipment change has occurred. Conceivably, this feature could also detect vehicle wear/maintenance issues, improper loading techniques as well as if the vehicle is being used for improper purposes.

Figure 8A:
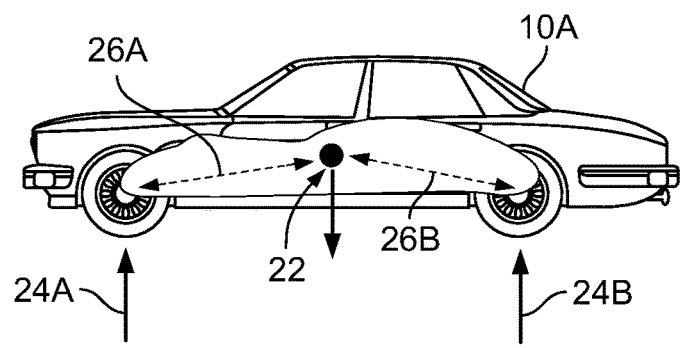
FIGS. 8A-8C depict different vehicle classes and their associated centers of gravity.
Figure 8B:
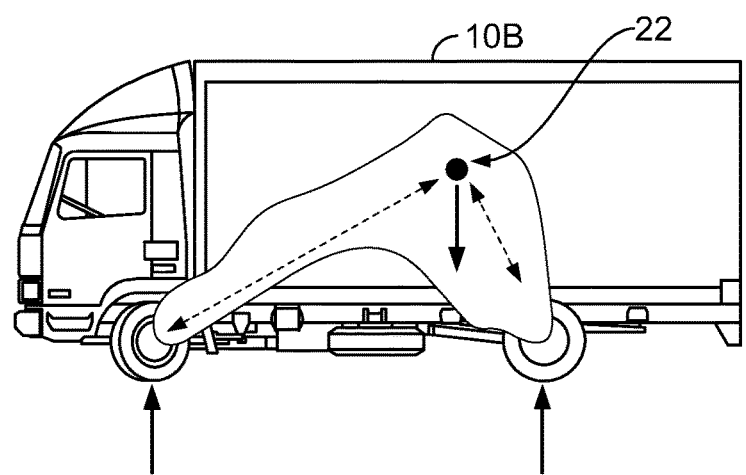
Figure 8C:
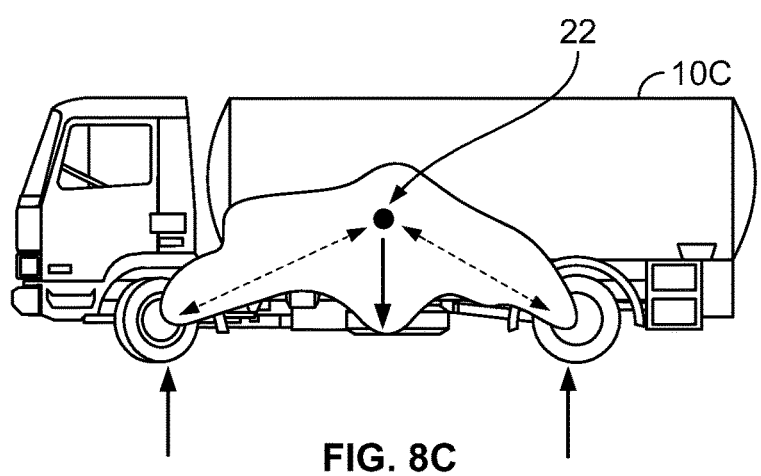

It is pointed out that the initializations and adjustments discussed herein are not intended to be confined to a particular event capture device or the event detector itself. Clearly, the aforementioned initialization and real-time adjustments could be implemented at any one of a number of places in the driving event detection system, including within the communications conduits interconnecting the various components. As such, the discussions here should be read to include any effective approach to detect vehicle spacial motion and adjust the driving event detector system's response to the detected vehicle motion "on the fly," rather than responding to static, predetermined sets of expected vehicle motion characteristics. FIGS. 8A-8C introduce yet another feature of the present invention.

FIGS. 8A-8C depict different vehicle classes and their associated centers of gravity 22. These figures are presented in order to introduce the reader to the concept of vehicle center of gravity for the purpose of its monitoring within the instant vehicle event detector/recorder. As shown in the passenger vehicle 10A of FIG. 8A, the center of gravity 22 is that imaginary point that mathematically represents the location and size of the vector representing the entire mass of the vehicle 10A. The center of gravity vector 22 points in the same direction as gravity.

Of course, there are forces in the opposite direction to the center of gravity vector 22. These are located at each of the wheels, and are indicated as first support force 24A and second support force 24B. Of course, in a four-wheeled vehicle, there would be third and fourth supporting forces (not shown) at the non-depicted wheels on the opposite side of the vehicle 10A. Each of the support forces 24 is separated from the center of gravity by their respective moment arm, e.g. 26A, 26B. The length of the respective moment arms 26 have a direct effect on the twisting forces being applied on the vehicle 10A, and are detectable by currently-available event capture devices 20.

A change in location of the center of gravity 22 will result in a change in one or all of the moment arms 26. Changes in the moment arms are known as "offsets" in the center of gravity ("CG Offsets"). A CG Offset can represent changes in vehicle loading, vehicle suspension, detector/capture device orientation, location or configuration, or a combination of these factors, among others. Monitoring CG and CG Offset provides the event detector system with additional real-time tuning capabilities not previously available.

FIG. 8B depicts the center of gravity 22 of a commercial cargo truck 10B. Here, we would expect a loaded vehicle to have a center of gravity 22 that is nearly centered on the cargo area, since here is where most of the vehicle's weight is. Clearly, the center of gravity 22, and therefore moment arms, would be extremely sensitive to load positioning and composition. Furthermore, note how high the center of gravity 22 of vehicle 10B is as compared to vehicle 110C. If we now turn to FIG. 9, we can examine bow the system of the present invention may utilize CG offset in order to "tune" the driver event monitoring and reporting system.

Figure 9:
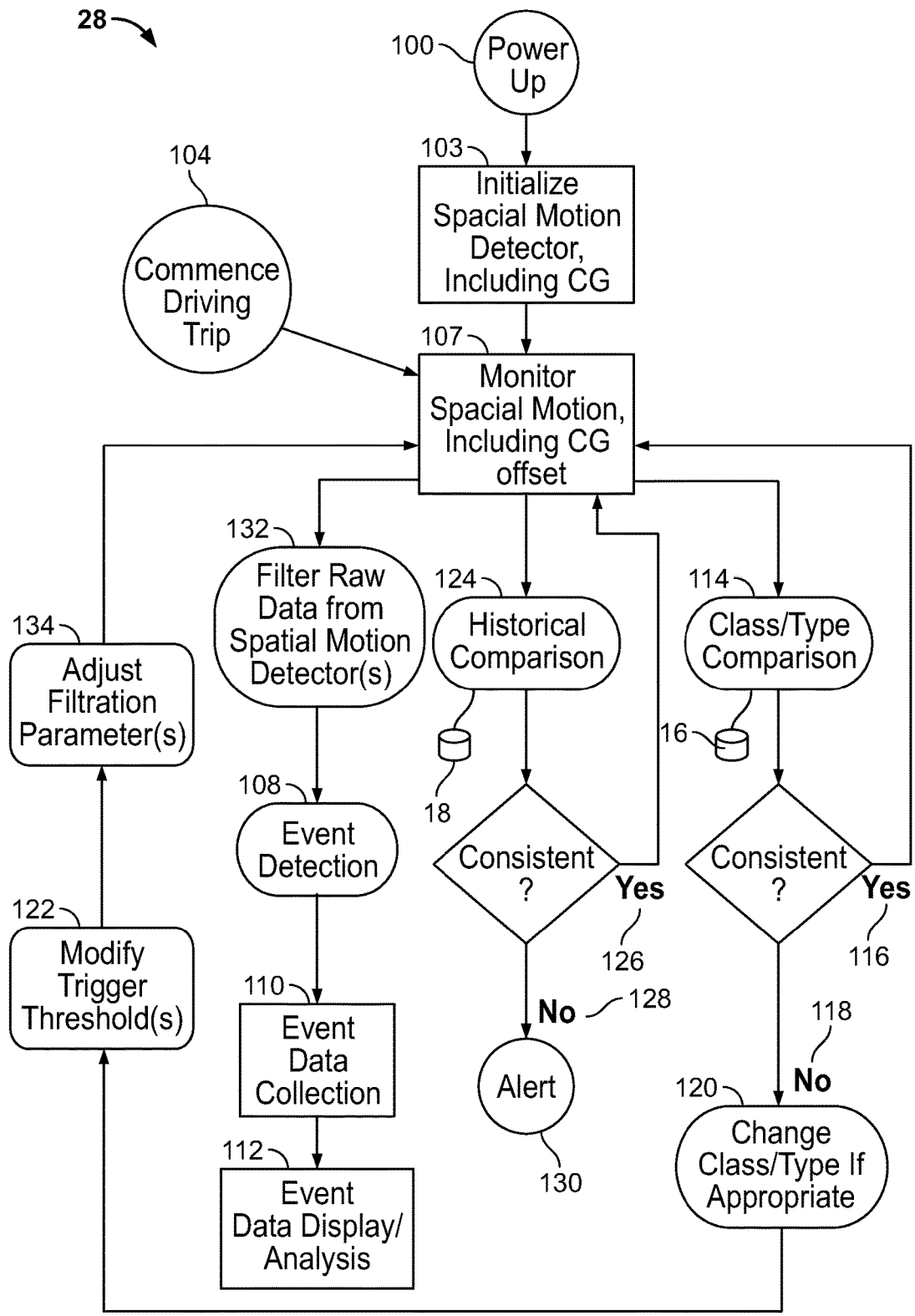
FIG. 9 is a flowchart depicting the steps of a preferred event detection method using real-time vehicle classification to filter sensor data.

FIG. 9 is a flowchart depicting the steps of a preferred event detection method using real-time vehicle classification to filter sensor data 28. Essentially, this method 28 is an expansion/modification of the method discussed above in connection with FIG. 7. The initialization of the spacial motion detector will now include a calibration of CG offset. Since CG offset is a dynamic characteristic, an initial setting will be necessary in order to detect an offset from historical or type/class normal. Subsequently, CG offset is monitored in addition to the other spacial motion elements 107 by the event capture devices (not shown).

The ultimate goal of a portable driving risk evaluation system is to be accurate 100% of the time, without need for human review or intervention. While this is only theoretically possible, there is benefit in implementing functional aspects within the event capture and detection system (i.e. the portable system) that will improve accuracy. Also, communications bandwidth between the portable systems and the central evaluation server will be optimized as event data reliability is increased (i.e. because "false positives" will be minimized). Such improvements in triggering accuracy mandate not only equipment detection improvements, but also improvements in data filtration. Filtering the raw data emanating from the event capture devices (not shown), if done properly in real-time, will improve system responsiveness, accuracy, and reduce communications bandwidth. It has been discovered that filtering the raw event capture device data responsive to CG offset is one very effective approach to achieve such gains. As a result, an extra step 132 wherein the raw data is filtered prior to event detection 108 has been added to the instant method.

Figure 10:
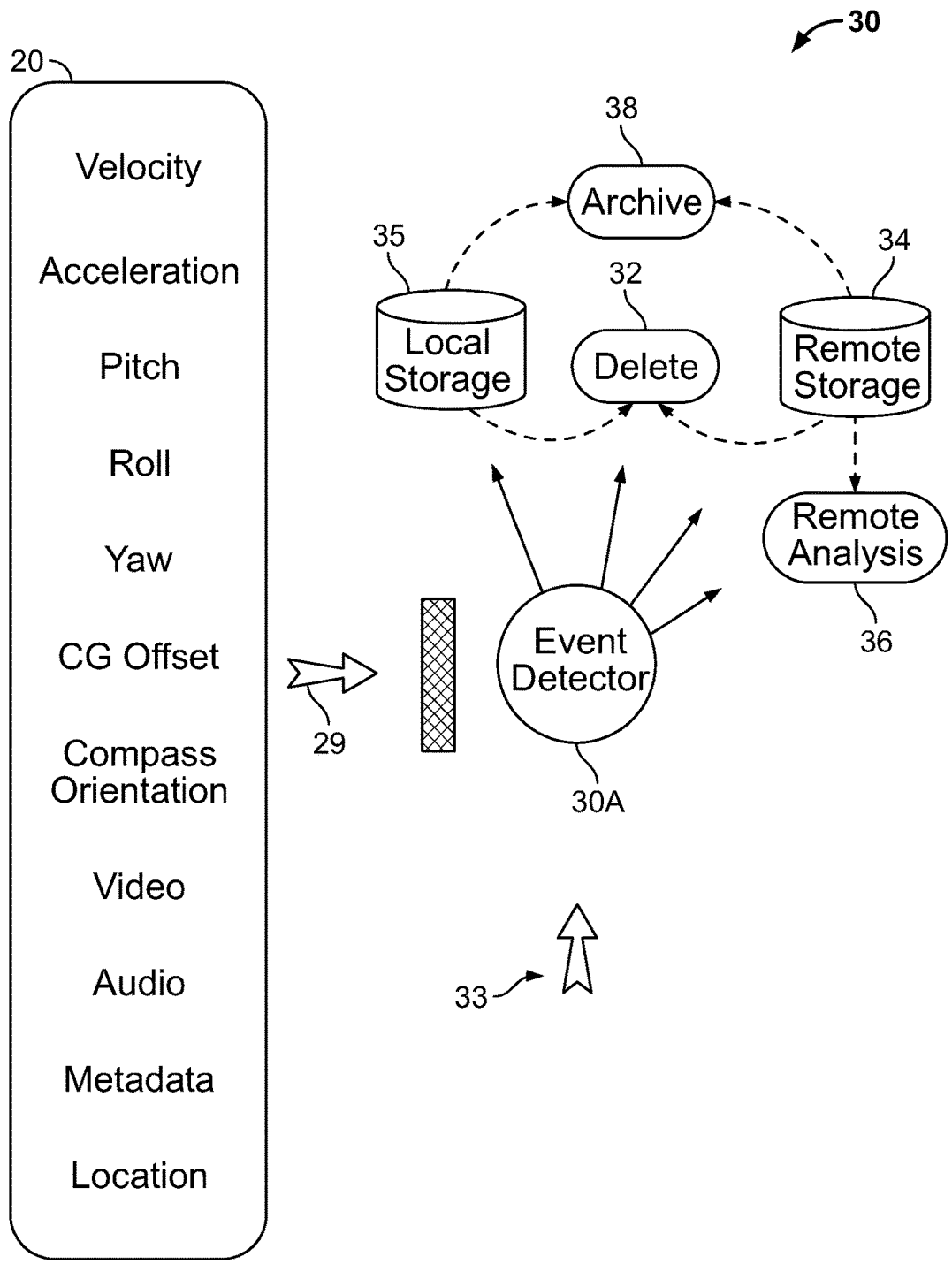
FIG. 10 is a block diagram depicting exemplary inputs to the event detector of FIG. 1, and the potential response results and destinations for detected events.

If the vehicle class/type is changed 120, the trigger thresholds 122 of the event detector will be modified, but other adjustments will also be made in real-time. The filtration parameters are also adjusted 134 on the raw data filters in response to changes in spacial motion profile. Since both raw data filtration and event detection trigger thresholds are being changed continuously as vehicle motion profile evolves (if appropriate), the optimum in accuracy of event detection (after event capture) is possible beyond what was previously available. FIG. 10 reviews the handling of driving events at a system level.

FIG. 10 is a block diagram depicting exemplary inputs to the event detector 30A of FIG. 1, and the potential response results and destinations for detected events. The communications with an external evaluation server is extensively discussed in the Parent Applications, and is therefore not reproduced there, but is rather incorporated herein by reference.

As shown, event capture devices 20 (including inputs from the OBD and other vehicle equipment) can generate captured event data for velocity, acceleration (linear), pitch, roll, yaw. Center of gravity and CG offset may also be used. Vehicle orientation relative to compass heading, as well as vehicle location may be included in event data. Finally, audio, video and metadata will likely be included.

The captured data 29 may be filtered by a real-time tunable raw data filter 31 before it is analyzed by the event detector 30A to determine whether or not a driving event of note has occurred. The criteria for making a type of driving event of note could be user-defined for their particular reason; such events of note may or may not otherwise be considered to be risky driving events, but are otherwise of interest to the user.

As discussed above, the event detector 30A response/trigger threshold is adjustable responsive to vehicle spacial motion profile changes. If appropriate, a trigger threshold tuner 33 will adjust the event detector 30A trigger threshold(s).

As events are detected by the event detector 30A, captured event data can be output in accordance with a number of options 30, including placement in a local storage repository 35. Transmission to a remote storage repository 34 may also occur, either automatically, or in response to user request. Furthermore, there may be a blend of local storage and partial transmission to remote storage 34. Remote analysis 36 can be conducted on remotely stored data as desired by the system custodian or other authorized individuals. Of course, it is also expected that a certain quantity of data that is initially stored locally and/or remotely will ultimately be deleted 32 in order to conserve. A remote archive data repository 38 is a potential destination for some of the data initially held in the local or remote data repositories 35, 34.

Those skilled in the art will appreciate that various adaptations and modifications of the just-described preferred embodiment can be configured without departing from me scope and spirit of the invention. Therefore, it is to be understood than within the scope of the appended claims, the invention may be practiced other than as specifically described herein.

What is claimed is:

1. A system for evaluating risk in driving, comprising:
an interface to receive a spacial motion data; and
a processor to:
   determine whether the spacial motion data falls within a vehicle profile of a vehicle;
   in response to a determination that the spacial motion data falls outside the vehicle profile, change at least one of an assigned class and an assigned type of the vehicle;
   in response to the changing at least one of the assigned class and the assigned type of the vehicle, automatically modify a trigger threshold level for event detection, wherein the threshold level is modified in real-time; and
   detect an event in response to a parameter meeting the modified trigger threshold level.

2. A system as in claim 1, wherein the spacial motion data comprises a motion in an x axis.

3. A system as in claim 1, wherein the spacial motion data comprises a motion in a y axis.

4. A system as in claim 1, wherein the spacial motion data comprises a motion in a z axis.

5. A system as in claim 1, wherein the spacial motion data comprises a pitch motion.

6. A system as in claim 1, wherein the spacial motion data comprises a roll motion.

7. A system as in claim 1, wherein the spacial motion data comprises a yaw motion.

8. A system as in claim 1, wherein the spacial motion data comprises an acceleration.

9. A system as in claim 1, wherein the vehicle profile comprises a range of motion.

10. A system as in claim 1, wherein the vehicle profile comprises a center of gravity location.

11. A system as in claim 1, wherein the vehicle profile comprises a rigidity of a ride.

12. A system as in claim 1, wherein the vehicle profile comprises a standardized motion profile.

13. A system as in claim 1, wherein the vehicle profile comprises a historical profile.

14. A system as in claim 1, wherein the vehicle profile comprises a changed profile.

15. A system as in claim 1, wherein the modification of the trigger threshold level is performed continuously.

16. A system as in claim 1, wherein the spacial motion data includes center of gravity information.

17. A system as in claim 1, wherein the modification of the trigger threshold level is in response to at least one of: a change in the center of gravity of the vehicle and a change in a moment arm associated with the center of gravity of the vehicle.

18. A system as in claim 1, wherein the vehicle profile is defined at least in part by a type of the vehicle.

19. A method for evaluating risk in driving, comprising:
receiving a spacial motion data;
determining, using a processor, whether the spacial motion data falls within a vehicle profile of a vehicle;
in response to a determination that the spacial motion data falls outside the vehicle profile, change at least one of an assigned class and an assigned type of the vehicle;
in response to the changing at least one of the assigned class and the assigned type of the vehicle, automatically modifying a trigger threshold level for event detection, wherein the threshold level is modified in real-time; and
detecting an event in response to a parameter meeting the modified trigger threshold level.

20. A non-transitory computer readable storage medium having an executable computer program for evaluating risk in driving stored thereon, wherein the program includes computer instructions for:
receiving a spacial motion data;
determining, using a processor, whether the spacial motion data falls within a vehicle profile of a vehicle;
in response to a determination that the spacial motion data falls outside the vehicle profile, change at least one of an assigned class and an assigned type of the vehicle;
in response to the changing at least one of the assigned class and the assigned type of the vehicle automatically modifying a trigger threshold level for event detection, wherein the threshold level is modified in real-time; and
detect an event in response to a parameter meeting the modified trigger threshold level.

* * * * *

UNITED STATES PATENT AND TRADEMARK OFFICE
CERTIFICATE OF CORRECTION

PATENT NO. : 9,922,470 B2
APPLICATION NO. : 14/880110
DATED : March 20, 2018
INVENTOR(S) : Cook et al.

Page 1 of 1

It is certified that error appears in the above-identified patent and that said Letters Patent is hereby corrected as shown below:

In the Claims

In Column 16, Claim 20, Line(s) 37, after "type of the", delete "vehicle" and insert --vehicle,-- therefor.

Signed and Sealed this
Thirty-first Day of July, 2018

Andrei Iancu
*Director of the United States Patent and Trademark Office*